United States Patent
Bouwknegt et al.

(10) Patent No.: US 10,917,682 B2
(45) Date of Patent: Feb. 9, 2021

(54) METHOD AND SYSTEM FOR SYNCHRONIZING MEDIA STREAMS

(71) Applicant: Telefonaktiebolaget LM Ericsson (publ), Stockholm (SE)

(72) Inventors: Dennis Erik Bouwknegt, Hilversum (NL); Henk Den Bok, Ede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 516 days.

(21) Appl. No.: 15/102,555

(22) PCT Filed: Dec. 11, 2013

(86) PCT No.: PCT/EP2013/076240
§ 371 (c)(1),
(2) Date: Jun. 8, 2016

(87) PCT Pub. No.: WO2015/086063
PCT Pub. Date: Jun. 18, 2015

(65) Prior Publication Data
US 2017/0026687 A1 Jan. 26, 2017

(51) Int. Cl.
*H04N 7/173* (2011.01)
*H04N 21/43* (2011.01)
(Continued)

(52) U.S. Cl.
CPC ..... *H04N 21/4307* (2013.01); *H04N 21/4126* (2013.01); *H04N 21/4316* (2013.01);
(Continued)

(58) Field of Classification Search
CPC ........... H04N 21/4307; H04N 21/4126; H04N 21/4316; H04N 21/4622
(Continued)

(56) References Cited

U.S. PATENT DOCUMENTS

| | | | | |
|---|---|---|---|---|
| 2006/0242161 A1* | 10/2006 | Ten Kate | .......... | G06F 17/30884 |
| 2007/0022437 A1* | 1/2007 | Gerken | .............. | H04N 7/17318 725/41 |

(Continued)

FOREIGN PATENT DOCUMENTS

| | | |
|---|---|---|
| EP | 2192776 A1 | 6/2010 |
| WO | 2007011889 A2 | 1/2007 |

(Continued)

*Primary Examiner* — Jivka A Rabovianski
(74) *Attorney, Agent, or Firm* — Coats & Bennett PLLC

(57) ABSTRACT

A method and system for synchronizing two or more media streams, generated by different sources (210, 220). An identifier generator 200 generates identifiers 600 with unique sequence numbers and a unique media identifier in relation to a second media stream generated by second media server 220. The generated identifiers are supplied to an encoder 230 and an identifier storage 205. In the identifier storage 205 a broadcaster stores an associated URL (first media server address & content) with a particular identifier. The identifiers and the second media stream 620A are encoded by the encoder 230 into a carrier (620M) which is recorded or broadcasted. Play-out of the recorded or broadcasted is accomplished by feeding the encoded carrier to a decoder 300, which decodes the identifiers and the second media stream 620B. The decoded identifier is received by a first device 310 that retrieves 560 the stored associated URL for the particular identifier and subsequently request 570 first media server 210 for the first media stream indicated by the associated URL. The first media stream 610 is provided 580 to the first device 310, which is also provided 552 with the decoded second media stream 620B.

18 Claims, 11 Drawing Sheets

7(11)

| Action list corresponding to 2nd media stream ABCDEFG | | |
|---|---|---|
| Identifier sequence nbr. | Type | Action Indicator |
| #00000000000001 | address | http://www.broadcasterX.com |
| #00000000000010 | setting | http://www.STBx.mode.com/initA |
| #00010000101010 | cache | http://www.webserver.domain/clipABC |
| #00010101001000 | present | #00010000101010 |
| #00110101001001 | control | http://www.STBx.cntr.com/close |

(51) Int. Cl.
*H04N 21/41* (2011.01)
*H04N 21/431* (2011.01)
*H04N 21/436* (2011.01)
*H04N 21/462* (2011.01)
*H04N 21/4722* (2011.01)
*H04N 21/6543* (2011.01)
*H04N 21/658* (2011.01)
*H04N 21/8352* (2011.01)
*H04N 21/858* (2011.01)

(52) U.S. Cl.
CPC ... *H04N 21/43615* (2013.01); *H04N 21/4622* (2013.01); *H04N 21/4722* (2013.01); *H04N 21/6543* (2013.01); *H04N 21/6581* (2013.01); *H04N 21/8352* (2013.01); *H04N 21/8586* (2013.01)

(58) Field of Classification Search
USPC .......... 725/40, 41, 100, 112, 134, 141, 11, 2
See application file for complete search history.

(56) References Cited

U.S. PATENT DOCUMENTS

| | | |
|---|---|---|
| 2008/0290987 A1 | 11/2008 | Li |
| 2008/0297654 A1 | 12/2008 | Verberkt et al. |
| 2010/0247061 A1 | 9/2010 | Bennett et al. |
| 2012/0197419 A1 | 8/2012 | Dhruv et al. |
| 2013/0024894 A1* | 1/2013 | Eyer .................. H04N 21/433 725/40 |
| 2013/0047181 A1 | 2/2013 | Recco |
| 2013/0074141 A1* | 3/2013 | Hwang ............. H04N 21/8126 725/116 |

FOREIGN PATENT DOCUMENTS

| | | |
|---|---|---|
| WO | 2011107536 A1 | 9/2011 |
| WO | 2012106269 A1 | 8/2012 |
| WO | 2012154541 A1 | 11/2012 |
| WO | 2012166094 A1 | 12/2012 |

* cited by examiner

STATE OF THE ART

Action list corresponding to 2nd media stream ABCDEFG

| Identifier sequence nbr. | Action Indicator |
|---|---|
| #0000000000001 | |
| #0000000000010 | http://www.webserver.domain/clipABC |
| #0000000000011 | |
| #000100000101010 | http://www.webserver.domain/clipPQR |
| #XXXXXXXXXXXX | http://www.XXXXXXXXXXX.XXX/XXX |

7(11)

Action list corresponding to 2nd media stream ABCDEFG

| Identifier sequence nbr. | Type | Action Indicator |
|---|---|---|
| #000000000000001 | address | http://www.broadcasterX.com |
| #000000000000010 | setting | http://www.STBx.mode.com/initA |
| #000100000101010 | cache | http://www.webserver.domain/clipABC |
| #000101010101000 | present | #000100000101010 |
| #001101010101001 | control | http://www.STBx.cntr.com/close |

Fig. 6B

METHOD AND SYSTEM FOR SYNCHRONIZING MEDIA STREAMS

TECHNICAL FIELD

The present invention relates generally to a method and a system to enable a synchronized handling of different media streams.

BACKGROUND

Watching a broadcasted documentary, news program, movie etc., on a device such as a television might be a desired experience, in particular when additional or supplementary information is shown on the same or another device.

In e.g. a broadcasted cooking program food is prepared as shown on a wall mounted television and at the same time a recipe with the amounts of ingredients is shown on another handy device, such as a tablet or smart-phone is shown, to allow a watching person e.g. to store the recipe for later use, to receive a voucher/token for reduced price, to receive information on the equipment used, etc. Additionally an application on the tablet or mobile phone might apply the stored recipe for ordering the ingredients at a nearby store.

In the example above, a tight synchronization between the broadcasted cooking program and the presented recipe is desirable but not a strict requirement.

In other examples there is however a tight synchronization required between the broadcasted media and the supporting media. E.g. when a hearing impaired person applies the supporting media to read the text, presented on a tablet or smart-phone, while watching a broadcasted or played-out recorded presentation, or when the list of ingredients is followed on a separate screen as they are being used by the cook.

Strict synchronization is even more required when a broadcasted or played-out recorded media stream and a supporting media stream are presented on the same device. E.g. a local generated advertisement-clip media stream is scheduled to fit in a time-gap or interrupts of a broadcasted media stream presentation, requiring an exact corresponding begin and end of both streams.

Strict synchronization is also required in cases where corresponding to a broadcasted media stream, certain equipment in the home environment has to be controlled, e.g. switched into a specific mode, or certain settings have to changed in relation to the broadcasted media stream and the supplemental media stream.

Strict synchronization is even more required in cases where an interactive broadcast comprising at least two media streams are provided to an end-user. The ability to synchronize media streams is essential as to provide a seamless interactive experience.

Prior art has presented solutions for synchronizing different media streams.

As an example publication WO 2012/154541 A1 titled "Broadcast-initiated delivery of auxiliary content using triggers", is presented.

This document describes, with reference to FIG. 1, a method and system 1 for synching of auxiliary (or supplementary) content related to primary content being transmitted by receiving a play-out list, and transmitting primary content to a primary screen device in accordance with play-out list, and transmitting event data to a server.

The document discloses the synchronization of auxiliary content from a server 100 with primary content from a broadcaster or content owner. The play-out center/broadcaster 100, in a general sense, represents a facility where content is transmitted from such a location and such content can be transmitted to a service provider that can be a satellite, cable, telecommunication, mobile or over the air terrestrial broadcaster for transmission to a device such as a television 110 (or any other primary screen in the home). The auxiliary content resides on a server 120 for delivery to a consumption or second screen device 130, 140 through a communication network or broadband connection and to be synchronized with the viewing of the content on the main screen As a further example of solutions for synchronizing different media streams, publication US2008/0297654 A1, titled "Script synchronization by watermarking", is presented.

This document describes a synchronizing method of content stream and script for use in e.g. home entertainment system, involves retrieving script corresponding to content and clock value extracted from watermark embedded into the content stream.

The method presented involves embedding the watermark including clock value that relates to time of embedding the clock value and initial clock value representing the start of the content stream, into the content stream. Each clock value is extracted from each embedded watermark. The script representing sensory effects to be output in effects signal for an effects controller, is retrieved corresponding to the content and extracted clock value.

The method presented is used for synchronizing content stream such as MPEG and MP3 content acquired over a broadcast channel, internet and recorded on DVD and script related to perceptual elements, for developing dramatic effects such as light, sound and other effects in home entertainment system, and in video games.

Synchronizing media streams that are generated by different sources, possibly following different routes to device or devices which are expected to present the streams in a synchronized way is a challenge. Solutions are considered to cope with several problems, e.g:

When two or more media streams, originated by different sources, destined for a single receiver, follow different routes (cable, satellite, Internet), each having its own delays or isochronicity characteristics, it is likely that a non-synchronized presentation at the receiver occurs.

When using different paths, one path may be more vulnerable to disturbances than the other, e.g. when deploying an audible path for transmitting watermarks in the broadcasted stream, this audible path is regarded sensitive to disturbance by environmental audio components, such as background noise, acoustical characteristics of the path, microphone and speaker transmission characteristics, etc.;

using the video or audio components for synchronization purposes, based on a watermarking principle, will degrade the original video or audio components;

using video or audio components for synchronization purposes based on fingerprinting techniques require substantial correlation calculations for a reliable synchronization, and last but not least, a solution should also work where rebroadcasting or time-shifting techniques are deployed. Also when parts of a broadcast are skipped, the synchronization between the streams must be maintained.

SUMMARY

It is an object of the present invention to provide a method, system and apparatus to enable supplying a user with accurate synchronized media streams.

In an aspect of the invention a method for synchronized provision of at least two different media streams to a first device is proposed, wherein the method is performed by a number of steps described below.

A first generating step generates an identifier, followed by storing the identifier with a corresponding action indicator, and additionally a carrier is encoded with the identifier and a second media stream.

In a next step the carrier received is decoded into the identifier and the second media, and the decoded identifier is submitted to the first device, as well as a decoded second media stream is provided to the first device.

In a further step the stored action indicator, which is corresponding to the decoded identifier, is retrieved by the first device, and the first device requests for the first media stream, represented by the retrieved stored action indicator. Subsequently the requested first media stream is provided to the first device. In this way the provisions of the first media stream and second media stream to the first device are synchronized to each other.

In another aspect of the invention, the decoded second media stream is provided additionally or alternatively to a second device.

In still another aspect of the invention the encoded carrier is transmitted to, or received from, any of a media distribution system or a media storage.

In still another aspect of the invention a method of a carrier encoding, for synchronized provision of at least two different media streams to a first device is proposed, wherein the method is performed by a number of steps described below.

As a first step an identifier is generated, wherein the identifier comprises a media indicator, which indicates a second media stream and a sequence number.

In a next step the identifier is stored with a corresponding or associated action indicator that indicates a first media stream. The identifier is stored in an identifier storage.

In a further step a carrier with is encoded with the identifier and the second media stream.

In still another aspect of the invention, the method of the carrier encoding proposes that the storing step of the identifier of the corresponding action indicator is performed in a database that has records, and where each record has the sequence number associated with zero or more corresponding action indicators.

In still another aspect of the invention, the method of the carrier encoding proposes that the encoding step comprises the encoding of the carrier with additional identifiers on equidistant time points from each other.

In still another aspect of the invention the method in the identifier generator proposes that the action indicator that indicates the first media stream is a Universal Resource Locator, URL.

In still another aspect of the invention the method in the identifier generator proposes that the identifier storage comprises the stored records for the identifier, and that the stored records comprise a type field, which filed is any of an address or a command type, to be executed by the first device.

In still another aspect of the invention a method in a first device for synchronized reception of at least two different media streams is proposed wherein the first device receives a decoded second media stream, which stream is decoded from a carrier. Wherein the method comprises a number of steps described below.

In a first step a decoded identifier, being decoded from the carrier, is received.

In a next step a stored action indicator is retrieved, wherein the action indicator corresponds to the decoded identifier.

In a further step a first media stream is requested, the media stream being represented by the retrieved stored action indicator. As a response the requested first media stream is received. In this way the receptions of the first media stream and second media stream to the first device are synchronized to each other.

In still another aspect of the invention, the method in the first device proposes that in the step of retrieving of the stored action indicator further comprises retrieval of a stored type of action. The type of action corresponds to the stored action indicator. Any subsequent execution of the action indicator depends on the interpretation of the retrieved type of action by the first device.

In still another aspect of the invention, the method in the first device further proposes that the type of action is any of the execution of:

an address change for the identifier storage, which address is different from the address in use by the first device;

a setting to be downloaded and executed in the first device, the setting applied for setting a particular mode of the first device;

a cache action for retrieving a download to local storage of the first media stream;

a present action for presenting the cached first media stream on a screen of the first device, and a control action to be performed by the first device, for controlling any of the decoder, the second device, or a further device.

In still another aspect of the invention, the method in the first device proposes to instructs the decoder to provide the decoded second media stream, additionally or alternatively to a second device.

In still another aspect of the invention a system for synchronized provision of at least two different media streams to a first device is proposed, wherein the system comprises the entities listed below.

A first entity comprised by the system is an identifier generator, which is arranged to generate an identifier, and a further entity being a storage that is arranged for storing the generated identifier, along with a corresponding or associated action indicator.

A still further entity comprised by the system is a first media server that is arranged to provide a first media stream.

A still further entity comprised by the system is a second media server that is arranged to provide a second media stream.

A still further entity comprised by the system is an encoder that is arranged to encode a carrier with the generated identifier and the second media stream.

A still further entity comprised by the system is a decoder that is arranged to decode the carrier into the identifier and the second media stream. The decoder is further arranged to submit the decoded identifier and to provide the decoded second media stream.

A still further entity comprised by the system is a first device that is arranged to receive the decoded identifier and is further arranged to retrieve a stored action indicator. The stored action indicator corresponds to the decoded identifier. The first device is still further arranged to request for a first media stream that is represented by the retrieved action indicator. The first device is still further arranged to receive the requested first media stream.

In still another aspect of the invention, the system for synchronized provision of at least two different media streams, further comprises a second device. The second device is arranged to receive the decoded second media stream. The decoder is arranged to provide the second media stream additionally or alternatively to the second device.

In still another aspect of the invention an Identifier generator for synchronized provision of at least two different media streams to a first device is proposed, wherein the identifier generator comprises a number of entities described below.

The identifier generator comprises a processor that is arranged to process program instructions.

The identifier generator further comprises a memory or storage arranged to store the program instructions.

The identifier generator still further comprises an interface that is arranged to commuticatively connect to other entities.

The identifier generator still further comprises an second media identity storage arranged to store an indicator (601) indicating a second media stream.

The identifier generator still further comprises a sequence number generator that is arranged to generate sequence numbers.

The processor is further arranged, under the program instructions, to control the media identity storage, the sequence number generator and the interface, in that the stored second media indicator and the generated sequence number are compiled into an identifier, which is transmitted via the interface.

In still another aspect of the invention the Identifier generator further comprises a timer that is arranged to time the generation of sequence numbers on equidistant time points.

In still another aspect of the invention a media device for synchronized provision of at least two different media streams to a first device is proposed, wherein the media device comprises a number of entities described below.

The media device comprises a processor that is arranged to process program instructions.

The media device further comprises a memory that is arranged to store the program instructions.

The media device still further comprises an interface that is arranged to connect to other entities.

The media device still further comprises a decoder that is arranged to decode an identifier and a second media stream from a received carrier.

The processor is further arranged, under the program instructions, to control the decoder, and the interface, in that the identifier and the second media stream are transmitted via the interface, and in that the first media stream is received and transmitted via the interface.

In still another aspect of the invention the media device still further comprises a first media stream storage that is arranged to cache the first media stream, albeit under control of the processor.

In still another aspect of the invention the media device still further comprises a control unit for controlling the second device, allowing the processor to provide commands, by proxy requested by the first device.

In still another aspect of the invention a first device for synchronized provision of at least two different media streams to a first device is proposed, wherein the first device comprises a number of entities described below.

The media device comprises a processor that is arranged to process program instructions.

The media device further comprises a memory that is arranged to store the program instructions.

The media device still further comprises an interface that is arranged to connect to other entities.

The media device still further comprises an identifier handler that is arranged to receive an identifier and arranged to apply the identifier as to retrieve a corresponding action indicator.

The media device still further comprises an indicator interpreter that is arranged to interpret the retrieved action indicator.

the processor is further arranged, under the program instructions, to control the identifier handler, the action indicator retriever, and the interface, in that the action indicator is received in response to the transmission of the identifier via the interface.

In still another aspect of the invention of the first device, the action indicator interpreter is further arranged to interpret a request for retrieving a first media stream, and in response to the interpretation initializes a requests for the first media stream.

In still another aspect of the invention of the first device, the action indicator interpreter is further arranged to interpret a command to present the cached first media stream on a screen of the first media device.

In still another aspect of the invention a computer program intended for a first device is proposed, wherein the computer program when being executed by a processor in the first device, is adapted to carry out or control a method for synchronized reception of at least two different media streams by the first device, wherein the computer program comprises a number of steps described below.

The computer program enables the first device to receive a decoded second media stream.

The computer program further enables the first device to receive a decoded identifier that is decoded from a carrier.

The computer program still further enables the first device to retrieve a stored action indicator that corresponds to the decoded identifier.

The computer program still further enables the first device to request for the first media stream that is represented by the retrieved stored action indicator.

The computer program still further enables the first device to receive the requested first media stream.

In still another aspect of the invention an apparatus for synchronized provision of at least two different media streams to a first device is proposed, wherein the apparatus comprises a number of modules described below.

The apparatus comprises a receiver module that is adapted for receiving a decoded identifier that is decoded from a carrier.

The apparatus further comprises a retriever module that is adapted for retrieving a stored action indicator that is corresponding to the received decoded identifier.

The apparatus still further comprises a requester module that is adapted for requesting the first media stream, which is represented by the retrieved stored action indicator.

The apparatus still further comprises a receiver module that is adapted for receiving the requested first media stream by the apparatus.

These and other embodiments according to the present invention are now illustrated in more detail with reference to the enclosed drawings.

BRIEF DESCRIPTION OF THE DRAWINGS

FIG. 6A is a diagram illustrating a table of an embodiment of method steps;

FIG. 6B is a diagram illustrating a table of an embodiment of method steps;

DETAILED DESCRIPTION

Figure 1:
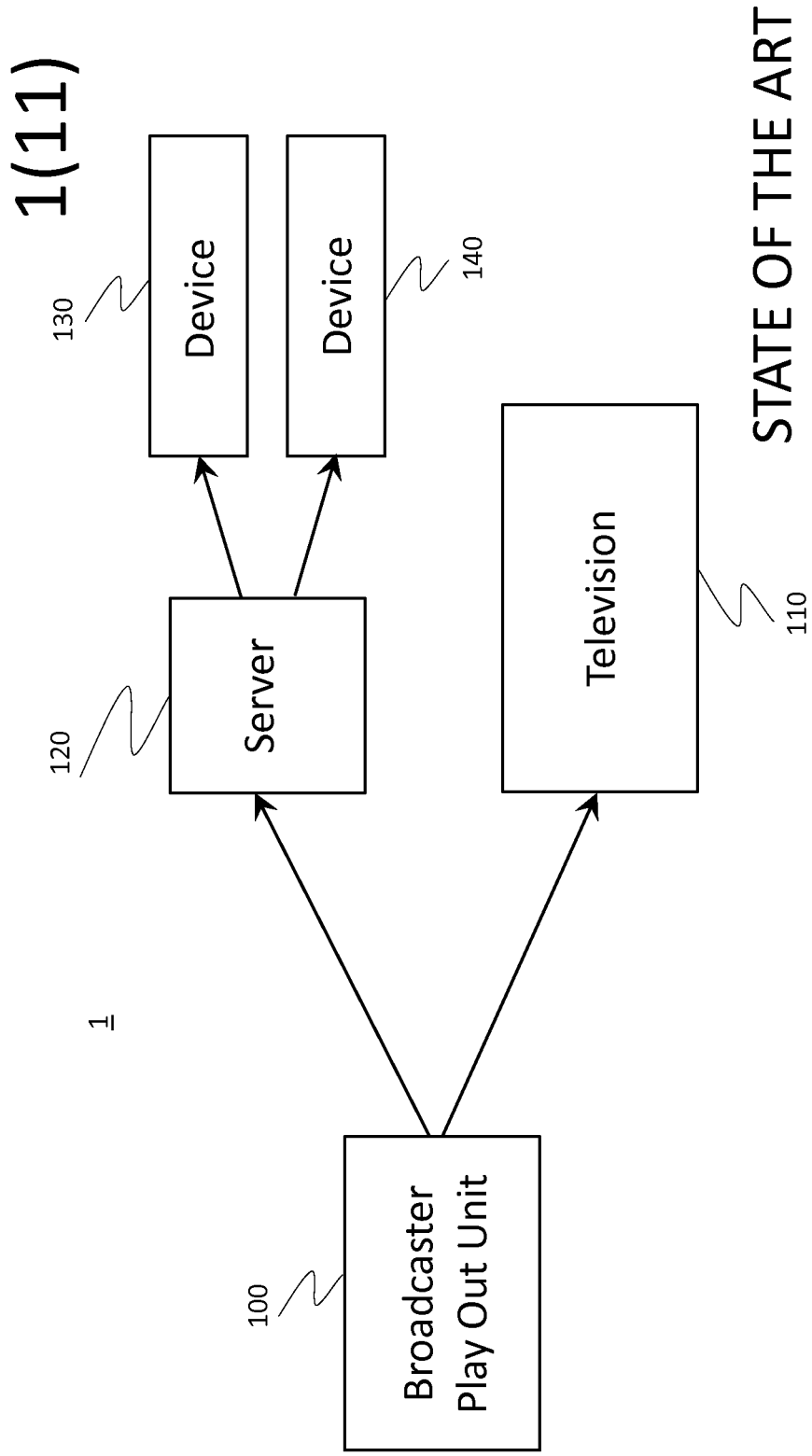
FIG. 1 is a block diagram illustrating a state of the art solution.
Figure 2:
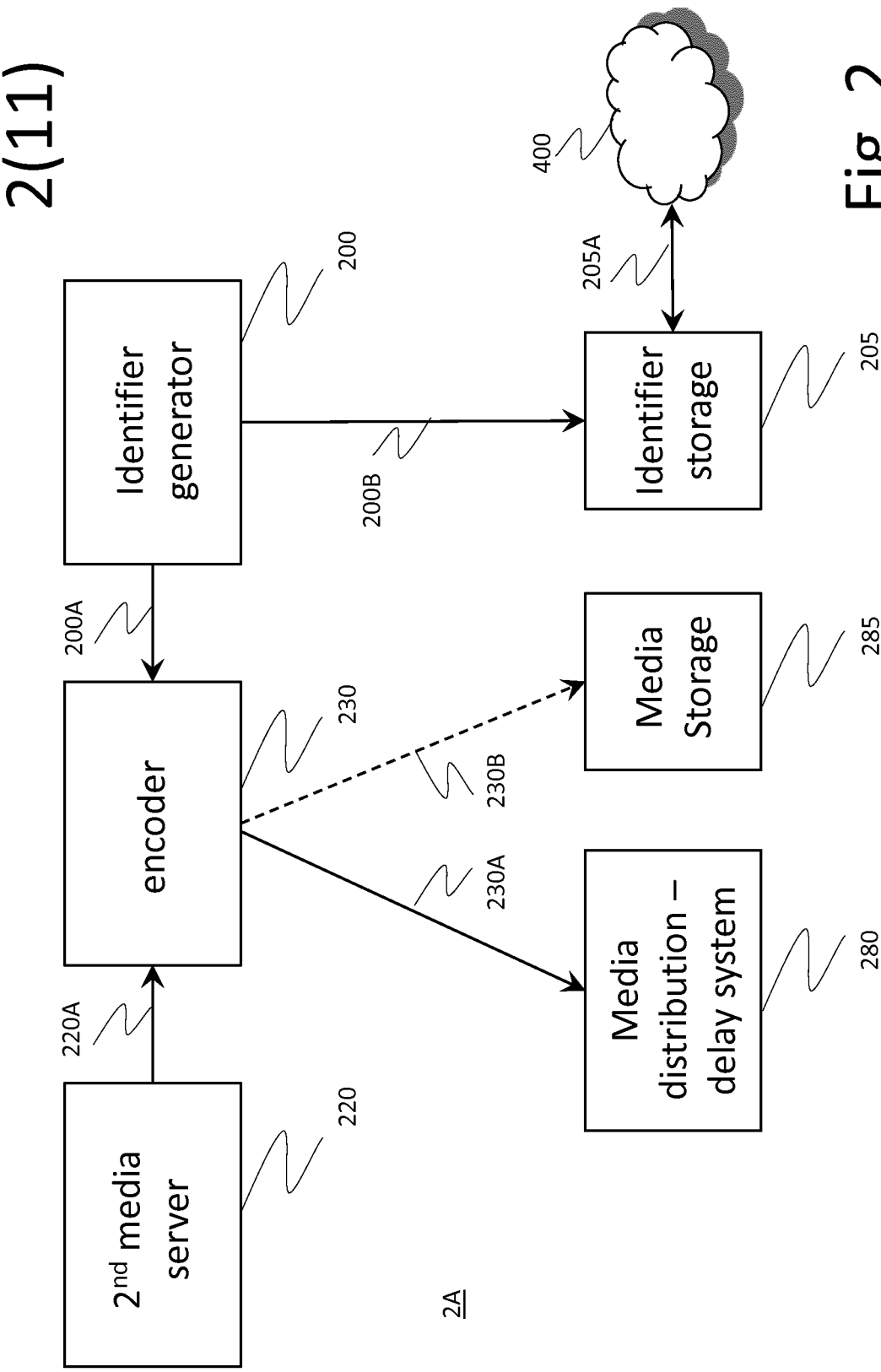
FIG. 2 is a block diagram illustrating an embodiment of a system.

FIG. 2 is a block diagram illustrating an embodiment of a system. System 2A comprises a generation and preparation part of the system for enabling synchronization of two or more media streams to one or more devices.

The term "broadcasting" is meant to be a transmission of media from one location to many, without direct interaction of one of the receivers.

Server 220 is arranged for generating a second media stream. This second media stream can be any of e.g. a video stream like a movie, a game, advertisement-clip, but also an audio stream like a radio program etc. or any combinations thereof.

An identifier generator 200 is arranged for generating identifiers that are to be used for synching two or more media streams, the stream generated by server 220, being one of these streams. The identifiers generated have a specific content and certain size and will be explained in more detail with FIGS. 4A and 5.

The identifiers generated by identifier generator 200 are stored in identifier storage 205. This identifier storage 205 receives the identifiers via link 200B communicatively connecting the identifier generator 200 and the identifier storage 205. The identifier storage 205 has next to link 200B a communicative connection 205A to the Internet 400. Further particulars on the storing of the identifier in identifier storage 205 will be explained in more detail in FIGS. 4A, 5, 6A and 6B.

Both the second media server 220 and the identifier generator 200 are communicatively connected respectively via links 220A and 200A to an encoder 230.

The encoder receives via link 220 the second media stream generated by server 220, and receives via link 200A the identifiers generated identifier generator 200. The identifiers submitted by the generator 200 to both the encoder 230 and the storage 205, are identical, and all identifiers submitted to the encoder 230 are also submitted to the storage 205.

The encoder 230 encodes a carrier with the second stream generated by server 220 and with the identifiers generated by generator 200. Suitable methods to encode the carrier are listed in MPEG-2 part 1, systems, formally known as ISO/IEC standard 13818-1 or ITI-T Rec. H.222.0.

The encoder 230 is communicatively connected via link 230A to a media distribution system 280 for providing the encoded carrier.

Figure 3:
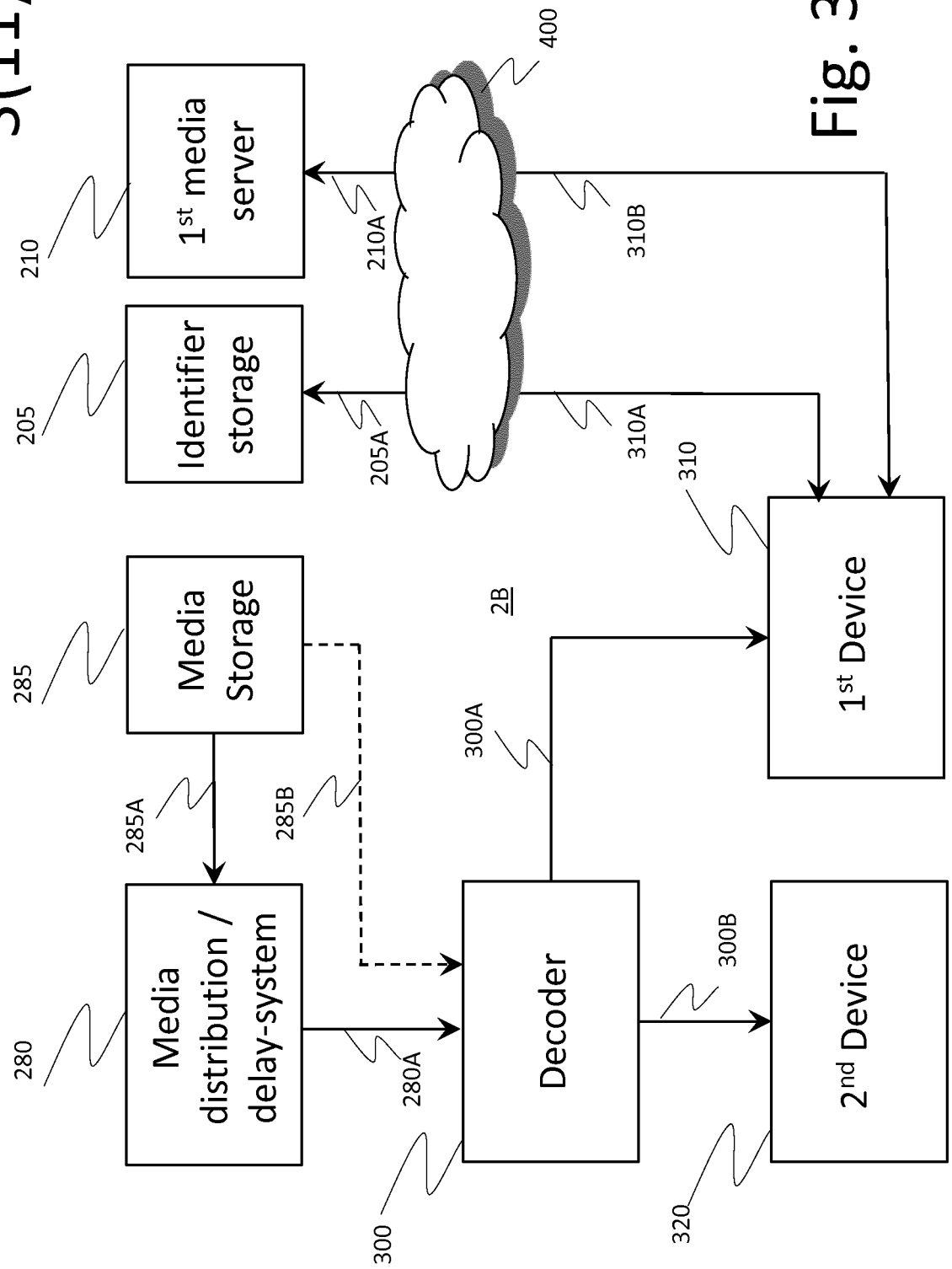
FIG. 3 is a block diagram illustrating an embodiment of a system.

The media distribution system 280 is arranged to broadcast the received encoded carrier via e.g. transmission stations, satellites, cable operators etc. The media distribution system 280 schematically presented in FIG. 2 and FIG. 3 is to be understood as the entire chain of equipment and links between the encoder's link 230A and the receiver's home environment, including media storage 285. The media distribution system as depicted may provide a pre-recoded broadcast, live broadcast or a semi-live broadcast when a delay is performed by the media distribution system for e.g. live sub-titling.

Additionally or alternatively to a live or semi-live broadcast, the encoded carrier from encoder 230 is provided via a communicative connection 230B to a media storage 285, where the encoded carrier is stored e.g. in a database, a cloud-based server, on a harddisk, or recorded on a disk, for later use.

FIG. 3 is a block diagram illustrating an embodiment of a system. System 2B comprises a broadcast and play-out part of the system for enabling synchronization of two or more media stream to one or more devices.

For a recorded broadcast scenario, media storage 285, as described with FIG. 2, is communicatively connected via link 285A to the media distribution system 280 for providing the stored or recorded encoded carrier for distribution.

For a non-recorded broadcast scenario, media distribution system 280, having received the encoded carrier from encoder 230, as described with FIG. 2, broadcasts the encoded carrier to e.g. Home-environments of users via schematically pictured communicative link 280A, which may comprise chains of nodes, links of antenna's, cabling, etc.

Alternative to broadcasting, a user may have access to a recorded media (available on e.g. disks, sticks, cloud) with the recorded carrier as explained with FIG. 2, media storage 285. Provision of the recorded media to the user's home-environment is depicted by link 285B.

A Decoder 300, located in the user's home environment decodes the carrier, either received via link 280A or 285B, into the second media stream and the identifiers, as explained with FIG. 2.

The decoder 300 provides the first device 310 via communicative link 300A with the decoded identifiers from the carrier. Decoder 300 provides the decoded second media stream via communicative link 300B to a second device 320.

Alternatively or additionally, the decoder provides the decoded second media stream to the first device 310. Details will be explained below.

The first device 310 receives the identifiers from the decoder 300 and is arranged to apply the identifiers for synchronizing the reception of the first and second media streams, received respectively from a first media server 210 and the second media server 220. First device 310 is communicatively connected to the first media server via the Internet 400 and links 310B and 210A. First device 310 is communicatively connected to the identifier storage 205 via the Internet 400 and links 310A and 205A.

First device 310 is any of a preferably mobile device like a tablet, laptop-Personal Computer, mobile phone, etc., having a screen for displaying, speaker and microphone and preferably a keyboard/mouse and/or touchscreen for interactive use. The onboard processor is enabled with an application or app to perform action on received triggers. The first device 310 is enabled to display the first media stream on its screen, and optionally the first device 310 is arranged as well to display the second media stream on its screen. In the latter case link 300A also transmits the second media stream. Communicative link 300A is preferably a wireless link, deployed by a Local Area Network protocol e.g. WiFi, IEEE 802.11, Bluetooth, etc., but can also be wired, e.g. by Ethernet.

The second device 320 receives the decoded second media stream from the decoder 300. This second device 320 is device with a screen for presenting the second media and is preferably arranged to receive commands, like e.g. setting changes. Second device 320 is connected to decoder 300 via a wired (e.g. Ethernet, etc.) or wireless link (e.g. WiFi, IEEE 802.11, Bluetooth, etc.) to decoder 300. Second device 320 is an output device with video and audio capabilities, e.g. a Television, a Personal Computer, a tablet, etc.

Figure 4A:
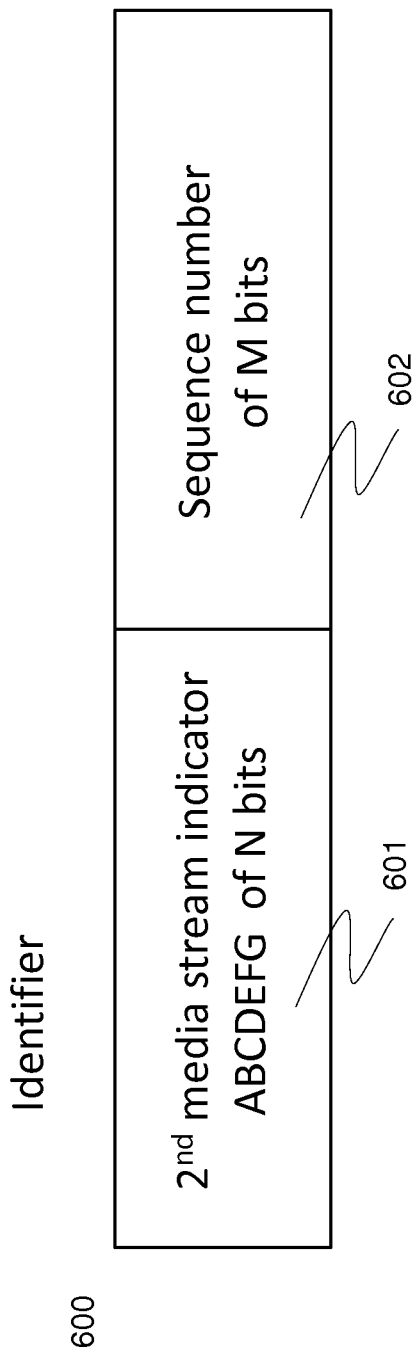
FIG. 4A is a block diagram illustrating an embodiment of an identifier.

FIG. 4A is a block diagram illustrating an embodiment of an identifier. The identifier 600, also known as "marker", is meant to be encoded in a carrier, be distributed either by broadcasting or recording, be decoded and delivered to equipment in the Home-environment. It is to be assumed that this coding and decoding is performed by digital techniques and substantially free of errors, enabled by error correcting techniques.

Figure 8:
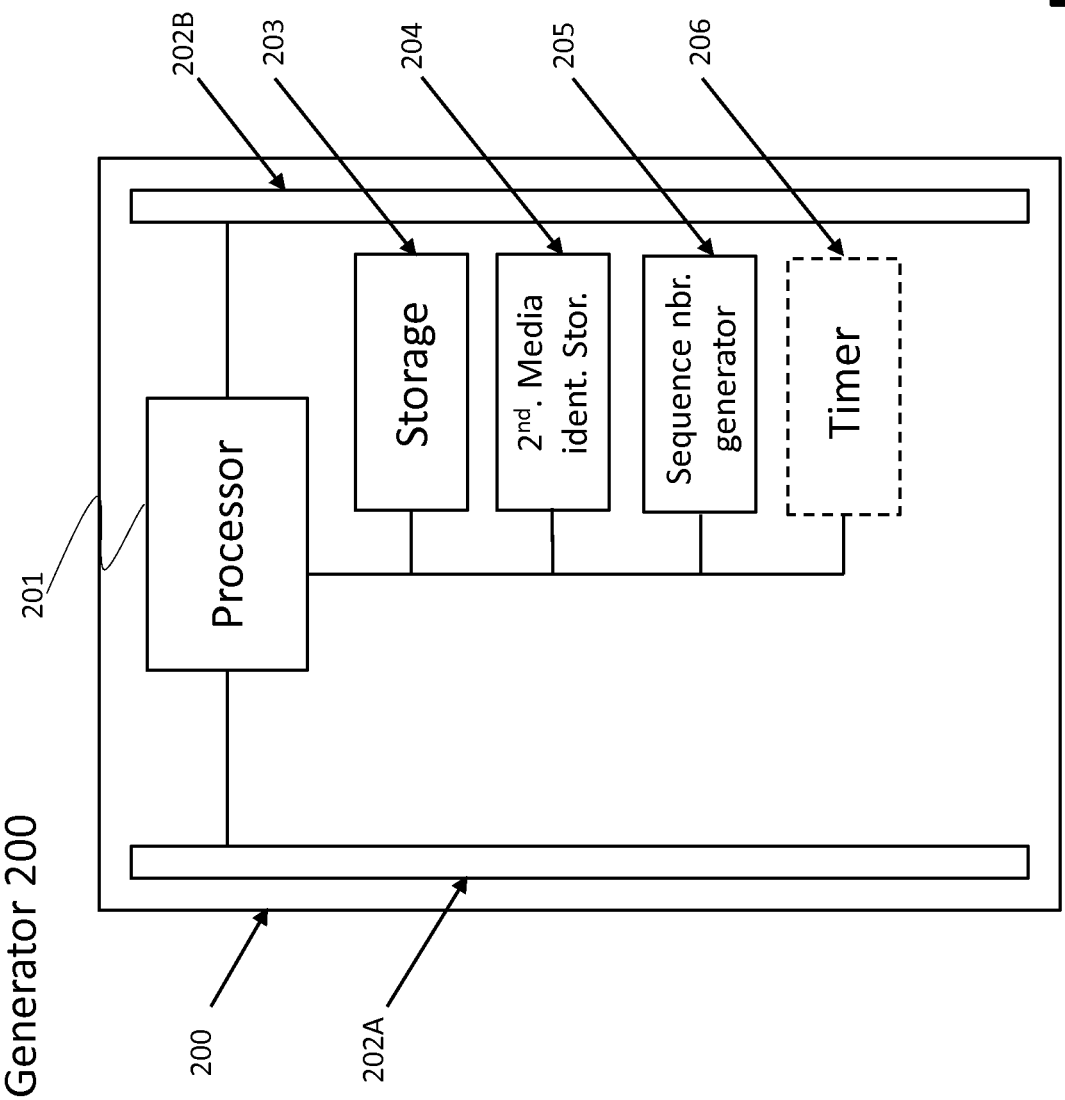
FIG. 8 is a block diagram illustrating an embodiment of a node.

Identifier generator 200 is the designated node to perform the generation of the identifiers, arranged thereto by a processor and an application, as explained with FIG. 8.

Identifier 600 comprises a "Media stream Indicator" 601 and a "Sequence number" 602. Media stream indicator 601 indicates a unique second media stream, designated in the figure for example "ABCDEFG". The term "Unique" means that within the context of the Identifier Storage 205, the Media stream Indicator is unique. In Case this indicator 601 indicating a specific second media stream is expected to be stored on more than one Identifier Storage 205, it is preferred to have a worldwide standard indicating this particular second media stream, e.g. being a movie. All identifiers 600, generated for a unique second media stream, have the very same second media stream indicator identifier 601. A total number N of 32 bits is regarded sufficient for unique second media stream indicators 601.

Sequence number 602 is a number that is preferably unique such that multiple identifiers 600, having the same second media stream indicator 601, have different sequence numbers. Sequence numbers generated by generator 200 are generated for a specific moment in the movie, such as at a so called "cliff-hanger" moment, or additionally or alternatively generated each 0.5-5 seconds, depending on the media to be encoded.

Taking into account that a movie may last up to 4 hours (=3600*4=14400 seconds) and each 0.5 second a sequence number should be generated, a total of roughly 30 k unique sequence numbers should be generated. Therefor 16 bits (=64 kb) would be sufficient for the sequence-number M in this example.

The suggested numbers N and M in this example, being 32 and 16 bits, being applied each 0.5 seconds, yields 96 bits/s, and is regarded low to a typical Audio/Video stream of 1-8 Mb/s.

Figure 4B:
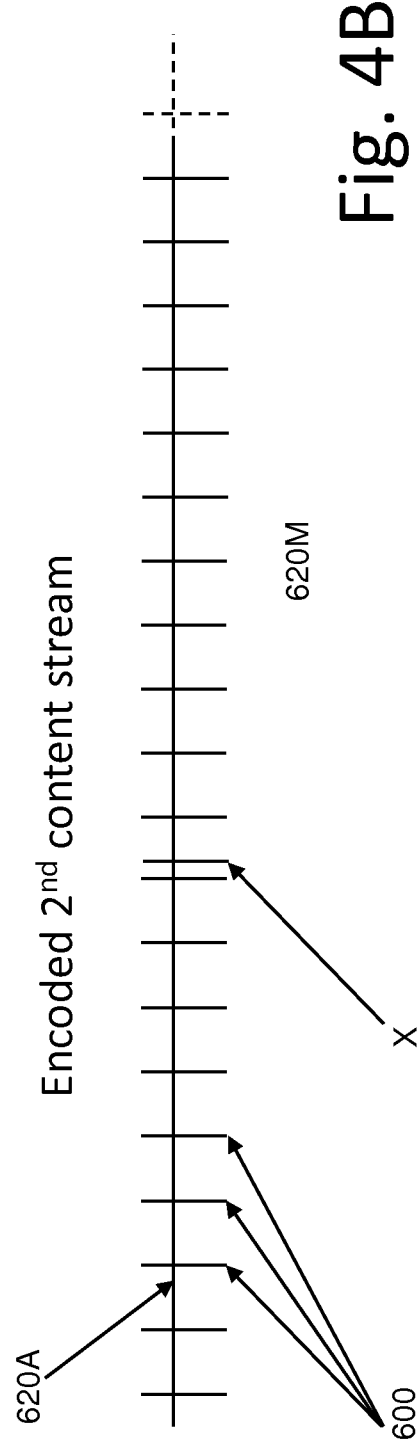
FIG. 4B is a block diagram illustrating an embodiment of a media stream.

FIG. 4B is a block diagram illustrating an embodiment of a media stream. FIG. 4B represents an encoded carrier 620M. The horizontal line 620A is the second media stream, and the vertical lines represent the identifiers 600 that are encoded mainly generated at an isochronous periods, although some identifiers, in this example the identifier referenced with an "X", is located at a specific location in the second media stream. Showing, as an example that both methods (isochronous and specific) can apply at the same time. Although only some identifiers have a reference signs, the reader may understand that all vertical lines are identifiers as defined with FIG. 4A.

Figure 5:
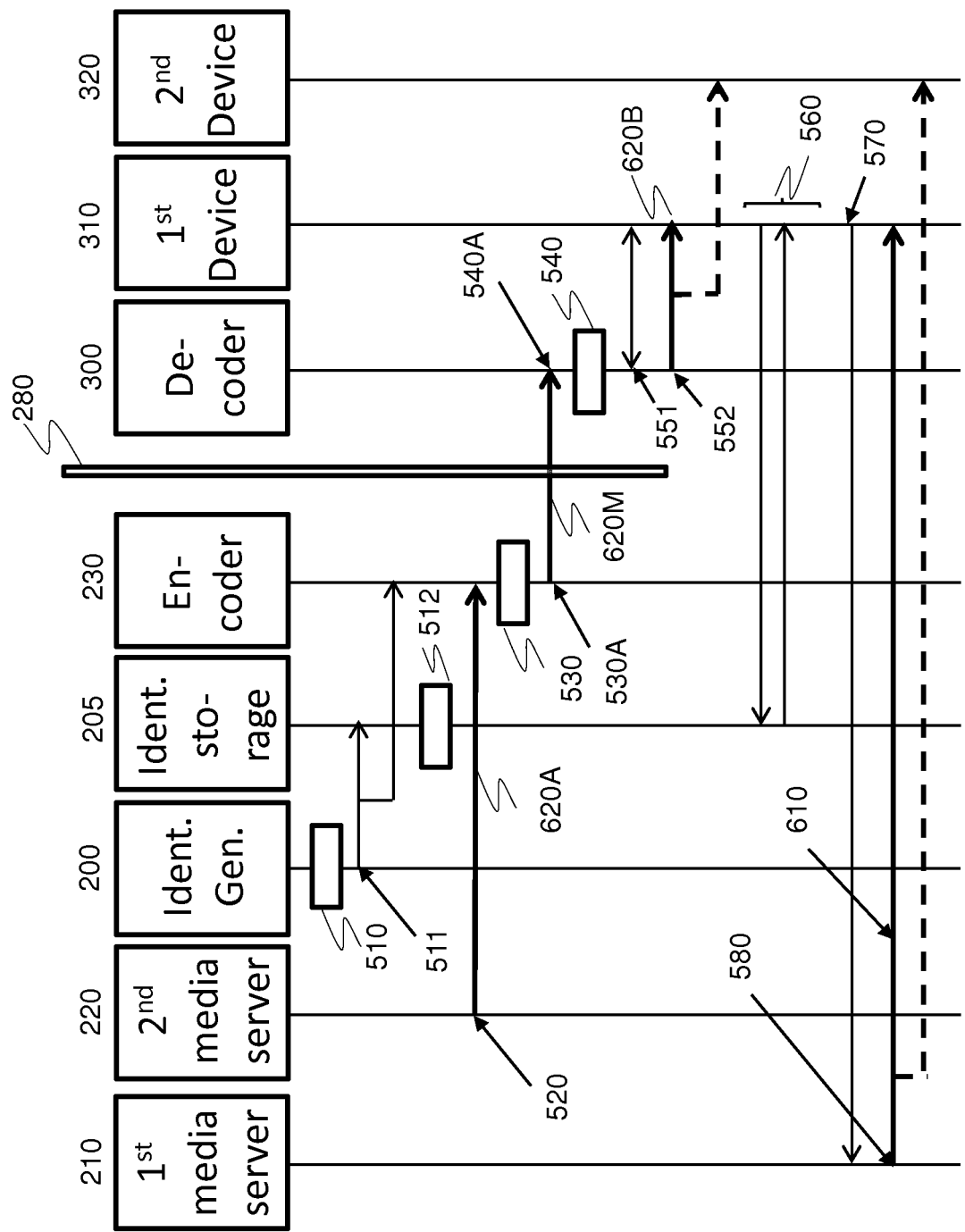
FIG. 5 is a signaling diagram illustrating an embodiment of method steps.

FIG. 5 is a signaling diagram illustrating an embodiment of method steps. The steps represented by FIG. 5 will be explained from left to right and top to bottom. In general the steps are dependent on each other, although some steps do not have a defined time relation to each other.

FIG. 5 will be explained with an example of a movie where advertisement-clips that should depend on the location where the movie is watched have to be filled in. E.g. as an example, a James Bond movie has been recorded and subtitled for language X, and the broadcaster Y needs to have advertisement-clips for language X filled in during the movie presentation, when the user is watching the movie, the characters X and Y being an example for indication of a language and a broadcaster. The particular movie with the advertisement-clips for language X shall be recorded in media storage 285, before broadcasting.

The Identifier generator 200 is initialized to generate identifiers 600, comprising a second media stream indicator 601, uniquely indicating the James Bond movie to be played-out for the language X by broadcaster Y and a sequence number. The sequence numbers added are both isochronous, for later references or add-ins, and refer to specific moments in the movie, such as special advertisement-clip moments. A special advertisement-clip moment can be the moment James Bond enters his car of a particular brand or uses his mobile phone of a particular brand, which timing has to be more accurate than say a second.

The identifier generator 200 is instructed to generate 510 identifiers 600 at each second and at some special moments, and submit 511 these identifiers to both identifier storage 205 and encoder 230.

When only isochronous identifiers are required, both second media server 220 and identifier generator 200 are instructed to start respectively with generating and submitting 511 identifiers and submitting 520 the second media stream 620A respectively, towards the encoder 230. The isochronous identifiers with their sequence numbers could be interpreted in this case as seconds, although not need to be. Sequence numbers might be concatenating and up or down counting, although do not need to be as long as being unique.

In case special advertisement-clip moments of the movie have to have a corresponding identifier, an additional identifier shall be initialized by generator 200 and submitted 511 as well to encoder 230.

The encoder 230 encodes 530 the entire movie with identifiers and provides 530A media storage 285 with the encoded carrier 620M.

After encoding the entire movie, identifier storage 205 comprises the entire range of identifiers 600 used, preferably arranged in an array of records for the specific second media stream indicator. It is up to the broadcaster to allocate a specific action to one or more of the identifiers. E.g. a specific advertisement-clip should be played-out, or a command to the Home-environment of the user should be sent. The advertisement-clip is the first media stream 610.

When a specific advertisement-clip e.g. as an example advertisement-clip XYZ should be played-out, the broadcaster should provide a server accessible to the first device 310, e.g. via the Internet or the telecommunication network, having the advertisement-clip XYZ accessible for its users, and attach the web-server address and the advertisement-clip XYZ designator (e.g. http://www.webserver.domain/clipXYZ) to the record of the particular identifier in identifier storage 205.

This process of attaching 512 a web-address to identifiers 600 is in this case a post-processing action, however this process can as well be on-line or done in advance when it is already known which identifiers with which sequence numbers at a certain moment in the second media stream occur.

It is assumed that the movie is recorded and retrieved by a user that plays-out the recorded movie, e.g. from a disk in a home-environment.

Decoder 300 receives 540A the encoded stream and starts decoding 540 of the encoded stream as pictured in FIG. 4A.

The decoder transmits 551 the decoded identifiers to the first device 310, and transmits 552 as well the decoded second media stream 620B to the first device 310, and additionally or alternatively to the second device 320.

The first device 310 receiving the identifier 600, requests 560 the Identifier storage 205 via the Internet 400 whether for the specific identifier 600, an action has to be performed, e.g. retrieving the first media stream 610, e.g. an advertisement-clip XYZ, or other information from a webserver.

In case the broadcaster has attached a webserver address to the particular identifier in the identifier storage 205, the reply from the storage 205 comprises the webserver address (i.e. first media server 210), and a next request 570 by the first device 310 will request the first media server 210 for the requested advertisement-clip XYZ.

The first device 310, receiving the advertisement-clip XYZ prioritizes the play-out of the advertisement-clip XYZ to be played-out on the screen of first device 310, or applies a picture in picture mode.

FIG. 6A is a diagram illustrating a table of an embodiment of method steps. FIG. 6A presents a part 605A of the contents of identifier storage 205, representing a number of records for a particular second media stream, identified with "ABCDEFG".

The leftmost column 602 comprises sequence numbers, expressed as an example in binary format, and the rightmost column, action indicator 603 comprise Universal Resource Locators (URLs), indicating where and which specific first media stream 610, e.g. advertisement-clip XYZ should be retrieved with step 570. Alternatively only the advertisement-clip XYZ identifier is listed when the first device 310 is preprogrammed with the URL of the webserver comprising the advertisement-clips representing the first media stream 610.

The caching of the specific first media stream 610 is performed in a storage local to first device 310. With "local" is meant the home-environment, either in the first device 310 or in a device communicatively connected to the first device 310. The specific first media stream 610 is cached accompanied with the sequence-number 602 related to the specific first media stream 610 as in table 605A, such that a later retrieval from the cache is accomplished with the related sequence number 602.

FIG. 6B is a diagram illustrating a table of an embodiment of method steps. FIG. 6B present a preferred embodiment of the invention. Apart from URLs which represent the first stream, commands are related to the sequence numbers for performing a specific action when the particular identifier occurs in the second media stream.

FIG. 6B presents apart of the contents 605B of identifier storage 205, representing a number of records for a particular second media stream, identified with "ABCDEFG".

The leftmost column 602 comprises sequence numbers, expressed as an example in binary format. The middle column, indicated in the header line as "Type" can be any of predetermined values:

address: an address for the identifier storage 205 different from the address in use by the first device 310 for this purpose;

setting: a URL to be retrieved, downloaded and executed in the first device 310, for setting a particular mode of the first device 310.

cache: comparable to the retrieving of the URLs in FIG. 6A, although it is restricted to downloading to local memory and waiting for a command to present the cached first media stream 610, thereby eliminating possible latency that could occur if this information was requested in real time. The local application caching the first media stream 610, stores the cached stream 610 in a storage local to first device 310, accompanied with a sequence number for later identification, in the embodiment of FIG. 6B, the advertisement-clip ABC, as an example, will be stored locally with identifier #00010000101010.

present: the locally stored stream with a particular identifier, in the example of FIG. 6B, identifier #00010000101010, has to be presented on the screen of first device 310, at the moment that sequence number #00010101001000 occurs in the second stream.

control: a command to have the first device 310 perform a control command, such as "close" in FIG. 6B intending to shut-off first device 310. A Web server maintains the particular commands for the specific type of device 310, such that first device 310 is expected to change a part (e.g. STBx) of the URL to retrieve the appropriate command ("close" in FIG. 6B) from the first device's 310 brand manufacturer. Alternatively a standard is raised with commands, recognised by an application on first device 310.

Additional control commands proposed:

cacheDLY, like "cache" but with a random delay, to prevent an overflow of simultaneous requests to the first media server 210, performed by the first device 310;

cacheFUT, cache the first media stream 610, being the URL indicated in the action indicator 603, to be played-out on occurrence of a specific sequence number AAA 602, applying the identifier "AAA" as an example to identify the specific identifier. The action indicator 603 comprises both the specific sequence number AAA and the URL. The first user device 610, receiving this control command caches the first media stream indicated by the URL, and stores the specific sequence number AAA in a local play-list storage and arms its detection unit to detect the reception of the specific sequence number. When the decoder 300 decodes 540 and submits 551 the specific sequence number, the first device 310 is arranged to detect a match between the received specific sequence number AAA and the stored specific sequence number AAA.

On a match the cached first media stream 610 indicated by the specific sequence number AAA is retrieved from the cache and played-out. Applying the "cacheFUT" command enables the first user device 310 to play-out the cached first media stream 610 without having to retrieve the action associated with an identifier 600 via the Internet 400 from identifier storage 205.

presFUT, present a cached first media stream in the future. Being an alternative to command cacheFUT. The first media stream 610 is already cached with a "cache" command. The presFUT command has two sequence numbers in the action indicator 603: a first one indicating the already cached first media stream 610 to be played-out, and a second sequence number indicating the specific sequence number AAA, when to play-out the already cached first media stream 610. Identical as in the cacheFUT command the first device 310. When the first device 310 retrieves the "presFUT" command, it stores the specific sequence number AAA in a local play-list storage and arms its detection unit to detect the reception of the specific sequence number. When the decoder 300 decodes 540 and submits 551 the specific sequence number, the first device 310 is arranged to detect a match between the received specific sequence number AAA and the stored specific sequence number AAA.

On a match the cached first media stream 610 indicated by the specific sequence number AAA is retrieved from the cache and played-out. Applying the "presFUT" command enables the first user device 310 to play-out the cached first media stream 610 without having to retrieve the action associated with an identifier 600 via the Internet 400 from identifier storage 205.

EXEC, load and execute a program on the first device 310, the program already cached with a "cache" command;

cacheMULT, multi-cache command: more than one URL is listed in the action indicator for the same sequence number, each URL having one or more predetermined characteristics, e.g. age-class, gender, language, country, etc., enabling e.g. customized advertisements to be played-out;

present the cached data on a specific device 310, 320;

enter a mode such as the picture in picture mode on the first device 310;

signal the second media stream server 220 to hold a stream for a predetermined period, etc.;

requesting a server for any particulars as date, time of the day;

requesting a server for the location of the user;

requesting a server for the account/identity of the user;

requesting a server to provide the decoded identifiers to the user's social media account;

requesting a server for identification of the first-310 or second-device 320, etc.

The address of the web-address of identifier storage 205 is predetermined in first device 310, or alternatively at the start of each encoded media stream 620M, the web-address of the identifier storage 205 encoded in the second media stream.

Figure 7:
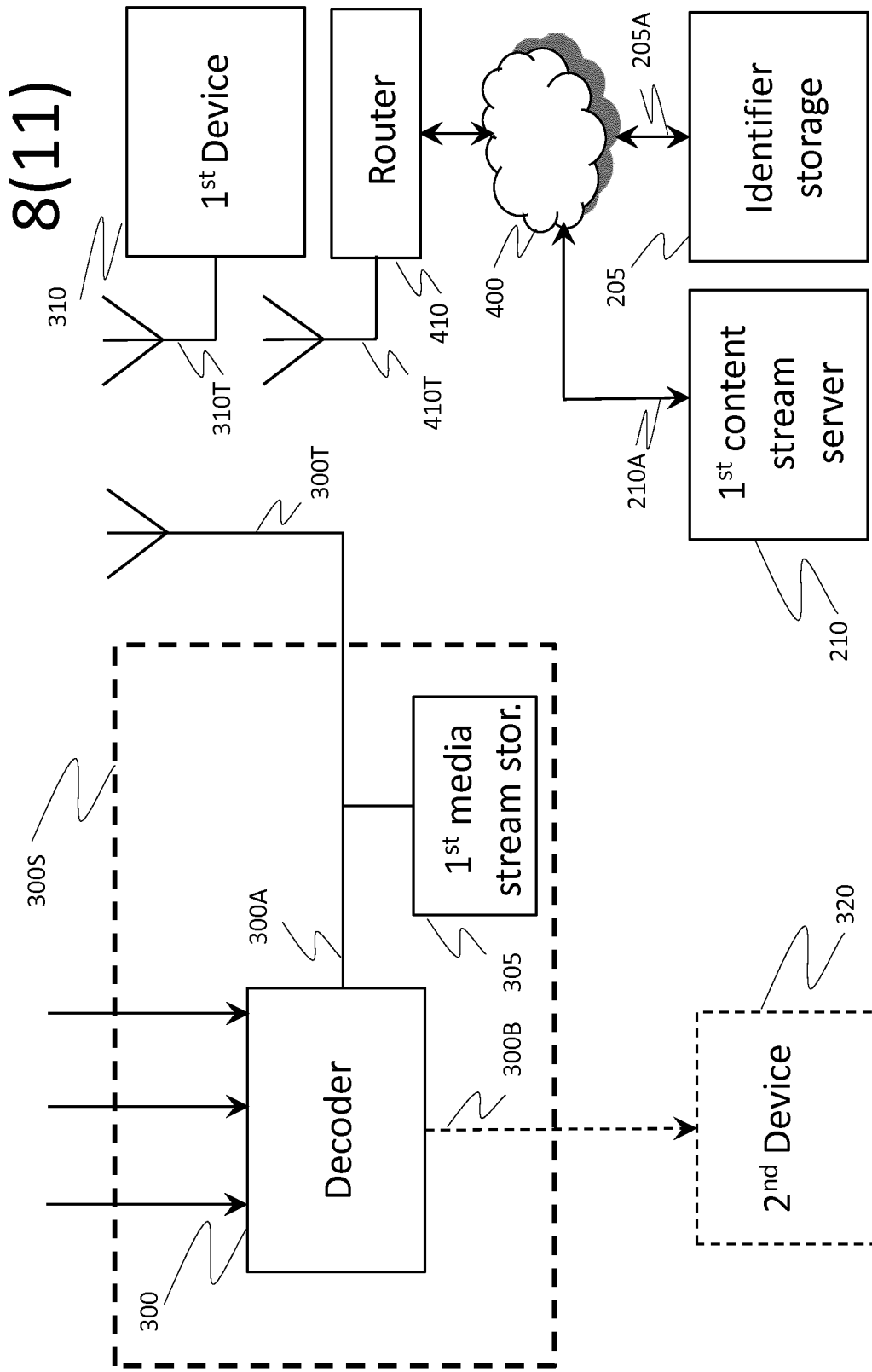
FIG. 7 is a block diagram illustrating an embodiment of a system.

FIG. 7 is a block diagram illustrating an embodiment of a system. FIG. 7 depicts an embodiment of the entities of the play-out environment of the system to synchronize the reception of at least two media streams.

A so called Set-top box (STB) 300S comprises the Decoder 300 and a first media stream storage 305, communicatively connected via link 300A. The decoder is optionally communicatively connected via link 300B to the second device 320, generally a device suitable to play-out a broadcasted or recorded media, e.g. a television, PC or tablet. Link 305 is wired e.g. Ethernet, etc. or wireless, e.g. IEEE 802.11, WiFi, Bluetooth, etc.

Decoder 300 and First media stream storage 305 are bidirectionally connected via link 300A to antenna 300T.

First device 310 is communicatively connected to the decoder 300, the first media stream storage 305, the second device 320, and the Internet 400, via its antenna 310T.

First device 310 accesses the Internet 400 via a wireless router 410, having an antenna 410T, and is thereby enabled to retrieve the action indicator 603 from identifier storage 205 via interface 205A, and request first content stream server 210 for the first content stream 610 via interface 210A.

In applying the preferred embodiment of FIG. 6B, by the environment of FIG. 7, the identifier storage comprises the action indicators 603 as explained with FIG. 6B, and the accompanying type field.

First device 310 shall, on receiving an identifier 600 from decoder 300, retrieve 560 the stored action indicator 603 and its accompanying type field. If the type filed indicates that the action indicator 603 is a first media stream 610, e.g. an advertisement-clip XYZ to be cached, the request 570 is performed by first device 310.

For broadcast of in particular recorded transmissions, it is an option to have the request for advertisement-clip XYZ, performed by first device 310, delayed for a random period, as to prevent flooding of requests at the very same time. Hence a command cache with delay (CacheDLY) is proposed. Caching is also known as pre-emptive loading of data.

The exact moment that a cached first media stream is to be presented is defined by a "present" command. The broadcaster has to take care that the commands "cache" or "cacheDLY" have corresponding identifiers 600 that are present in the encoded stream early enough to allow the caching of the first media stream 610.

For programs that are known in advance, the caching of the first media stream 610 may take place long before the actual play-out occurs, e.g. in non-busy-hours on the Internet, enabling load-spreading. In this case it is proposed that a carrier with the identifiers 600 is e.g. via one of the active channels received by the decoder 300 and provided to the first device 310, where a local application decides whether the associated identifiers are used for retrieving 560 the action indicators 603 and subsequently requested 570.

Caching of the first media stream 610 comprising a small amount of data is preferably stored on storage available in the first device 310. A large amount of data is, due to limited availability of local storage, preferably stored on the Set-top box 300S, generally comprising a harddisk 305 enabling storage of Terabytes.

The short-range Wireless connections via antennas 300t, 310T, and 410T in this example are exchangeable for wired connections, although regarded as reducing mobility and/or flexibility in deployment. Interfaces to antennas 300T, 310T, and 410T are regarded to be bi-directional, hence suited to receive and transmit.

The system as proposed allows multiple first devices 310 to act simultaneously in receiving the second media stream 620B and the identifiers 600, decoded by decoder 300. This property provides the advantage that several users in the same Home-environment, watching the same broadcast, are enabled at an advertisement-clip moment to receive personalised advertisement-clips.

As explained with the example of FIG. 5, the method and system proposed have the ability to play-out particular, broadcaster allocated advertisement-clips, taking precedence over the advertisements in the second media stream. The so-called "local add" insertion.

By applying a local application on the first device 310, a predefined local profile of the user is matched with the characteristics of the advertisements-clips, indicated in the action list 605B, as explained with the "cacheMULT" command with FIG. 6B.

The advertisement-clip with the highest characteristic correlation is cached and played-out when the particular identifier 600, having the command to playing-out the cached first media stream 610, having as an action indicator 603 the same number as the sequence number 602 of the "cacheMULT".

As a result, a family simultaneously watching the James Bond movie of the example of FIG. 5, comprising youngsters and adults may have different advertisement-clips, e.g. a car advertisement-clip on the adults screen vs. a toy advertisement-clip on the youngsters screen.

In case a broadcaster opens the possibility to interact with a broadcast transmission. One of the identifiers 600 enables loading of an application program (app) (EXEC command, see explanation with FIG. 6B) in the first device 310 by means of an appropriate action indicator 603, as explained above. On the occurrence of a particular identifier 600 in the second media stream 620B, the user is enabled to reply to a Web-server of the broadcaster under control of the app.

FIG. 8 is a block diagram illustrating an embodiment of a node. Identifier generator 200 is entity arranged to generate the identifiers 600 comprising the second media stream indicator 601 and the sequence number 602, as explained with FIG. 4A.

Identity generator 200 has a processor 201 arranged to process program instructions stored in a storage unit 203, and has additionally:
  an interface 202A, 202B for communicatively connecting to the identifier storage, 205, the encoder 230 and the Internet 400; Interface 202A, 202B can be wired, e.g. Ethernet, etc., or wireless e.g. IEEE 802.11, WiFi or Bluetooth, etc.
  A second media identifier storage 204 for maintaining the second media stream indicator 601 during the identifier generation process 510. The value of indicator 601 is received e.g. via the Internet via the interface 202A, 202B;
  A sequence number generator 205, providing a sequence number when the processor 201 requests for a sequence number 602. Sequence numbers can be random, up-counting, down-counting, although preferably unique in the sense of being unique for one second stream media indicator 601;
  A timer unit 206, that triggers the processor to provide an identifier 600 to the encoder and the identifier storage 205

The processor 201 is under the program instructions in control of the entities in the Identifier generator 200 listed, via an internal bus structure connecting all the entities in the Identifier generator 200

Processor 201 controls the generation 510 of identifiers 600, by equidistant timing, or specific timing, or a combination of both.

If a broadcaster requires equidistant timing of the identifiers 600, the processor instructs timer unit 206 to provide an interrupt at predetermined periods, whereafter on each interrupt the processor 201 requests the sequence number generator 205 to provide a sequence number. The processor 201 compiles this sequence number 602 in an identifier 600 together with the second media stream indicator 601, retrieved from second media identifier storage 204, and transmits this compiled identifier via interface 202A,202B.

If a broadcaster requires specific timing of identifiers, the processor waits to detect an order via interface 202A, 202B for compiling an identifier 600. On a detection of an order, the processor 201 requests the sequence number generator 205 to provide a sequence number, and the processor 201 compiles and transmits the sequence number 602 as explained above.

The order to compile an identifier at a specific timing, can be e.g. manually initialized via the interface 202A, 202B, or derived by a detection when e.g. the content of the second media stream 620A changes from a movie to an advertisement-clip.

Figure 9:
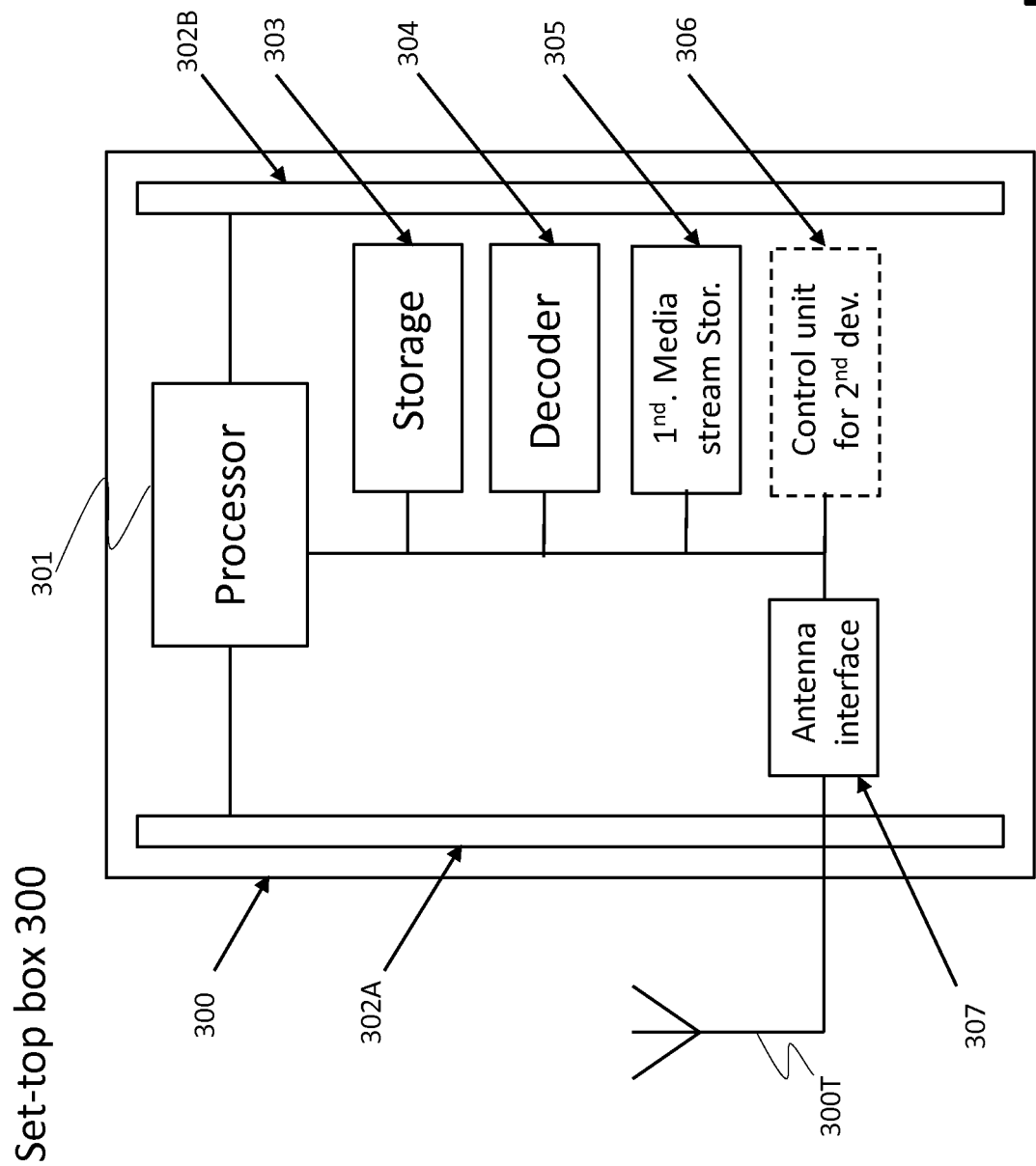
FIG. 9 is a block diagram illustrating an embodiment of a node.

FIG. 9 is a block diagram illustrating an embodiment of a node. Set-top box 300S is entity arranged to decode the encode carrier 620M and provide the decoded identifiers 600 and the decoded second media stream 620B to the first device 310 as explained with FIG. 5.

The Set-top box 300S is arranged to accept or reply to requests of the first device 310 to control the Set-top box 300S. An example of requests are e.g. to provide, or hold the decoded second content stream 620B to the second device 320.

Optionally the second content stream 620B is by default operationally communicatively connected to the second device 320 via the interface 302A, 302B;

Set-top box 300S has a processor 301 arranged to process program instructions stored in a storage unit 303, and has additionally:
  an interface 302A, 302B for communicatively connecting to the media distribution system 280, the media storage 285 and the second device 320. Interface 302A, 302B can be wired, e.g. Ethernet, etc., or wireless e.g. IEEE 802.11, WiFi or Bluetooth, etc.
  A decoder 300 to decode the received encoded carrier 620M into the identifiers 600 and the media stream 620B;
  a first media stream storage 205 for storing a substantially large first media streams 610, stored by request of the first device 310, and retrieved from this storage 205 by the first device 310, applying storage 205 as a local cache;
  A control unit 306 for the second device 320, allowing the processor 301 to provide commands, by proxy requested by the first device 310, to control the second device 320.
  Examples of control commands are e.g. freezing the current screen, or switching off or on the second device.
  Antenna Interface 307, communicatively connected to antenna 300T, arranged for short range communication, as to transmit and receive communication with the first device 310, e.g. transmission of Identifiers 600, and reception of commands for the second device 320.

The processor 301 is under the program instructions in control of the entities in the Set-top box 300S listed, via an internal bus structure connecting all the entities in the Set-top box 300S.

Figure 10:
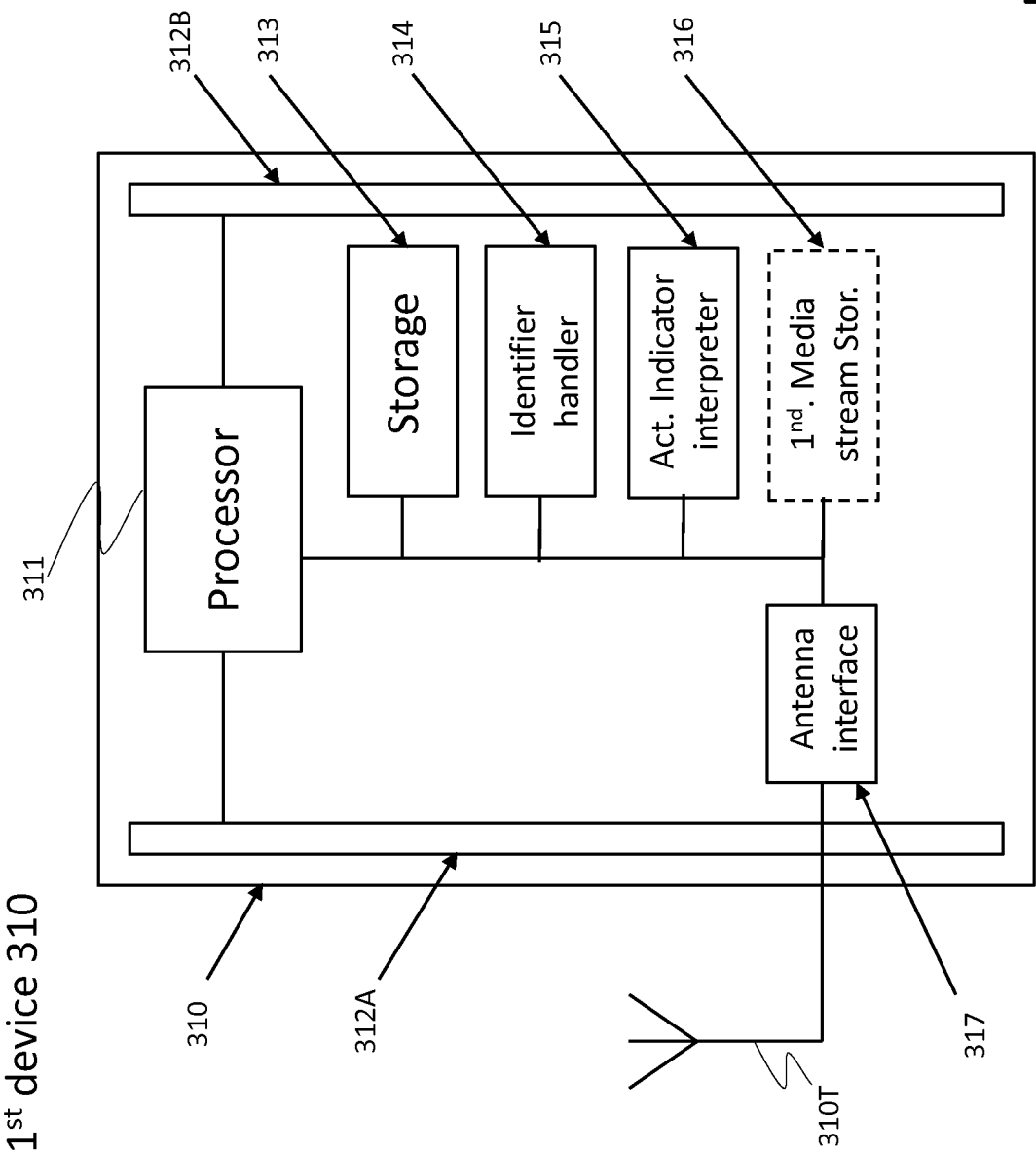
FIG. 10 is a block diagram illustrating an embodiment of a device.

FIG. 10 is a block diagram illustrating an embodiment of a device. First device 310 is entity arranged receive identifiers 600, to request the identifier storage 205 for an action indicator corresponding to the identifier 600, to resolve retrieved URLs in relation to the identifier 600, to load and execute programs in relation to the identifier 600, and to act based on identifiers received, as explained with FIGS. 5, 6A, 6B and 7. First device 310 has a processor 311 arranged to process program instructions stored in a storage unit 313, storage unit 313 additionally comprises the address of identifier storage 205. First device 310 has additionally:
  an interface 312A, 312B for communication with a user by means of a keyboard, mouse, a screen, a camera, a speaker, a microphone, etc. For additional equipment, the interface 312A, 312B can be wired, e.g. Ethernet, etc., or wireless e.g. IEEE 802.11, WiFi or Bluetooth, etc.;

an identifier handler 314 arranged to receive the identifiers 600 transmitted by the decoder 300, and arranged to retrieve the action indicator 603 by means of submitting the identifier 600 towards the Identifier storage 205. The identifier handler 314 optionally arranged to derive the second media stream indicator 601 from the identifier and decide whether to continue in retrieving the action indicator 603 according to a predetermined parental control setting.

The identifier handler 314 is further optionally additionally arranged to cope with cacheFUT and presFUT commands as explained the description of FIG. 6B. The first user device 610, receiving these control command caches (only for cacheFUT) the first media stream indicated by the URL, and stores the specific sequence number AAA in a local play-list storage and arms its detection unit to detect the reception of the specific sequence number. When the decoder 300 decodes 540 and submits 551 the specific sequence number, the first device 310 is arranged to detect a match between the received specific sequence number AAA and the stored specific sequence number AAA.

On a match the cached first media stream 610 indicated by the specific sequence number AAA is retrieved from the cache and played-out. Applying the "cacheFUT" and "presFUT" commands enables the first user device 310 to play-out the cached first media stream 610 without having to retrieve the action associated with an identifier 600 via the Internet 400 from identifier storage 205.

an indicator interpreter 315, arranged for interpreting the retrieved action indicator 603. In case no type of action is retrieved from identifier storage 205, the URL indicating the first media stream 610, is requested 570 and played on the screen of first user device 310, according to the description of embodiment of FIG. 6A.

When applying the features described with the embodiment of FIG. 6B, a type of action is involved, the action indicator 603 indicating information or a command, the command is executed by the first device 310.

With reference to the description with FIG. 6B, the action indicator interpreter 315 performs under control of the processor 311, among others:

the address command: the action indicator interpreter 315 initializes replacement of the address indicating the identifier storage 205 in storage 313 with the address in the action indicator 603;

the setting command: the action indicator interpreter 315 initializes a download and execution of the file indicated by the URL in the action indicator 603, in the first device 310;

the cache command: the action indicator interpreter 315 initializes retrieving 560 the address to be applied in a further request for retrieving 570 the associated first media stream 610 indicated by the URL in the action indicator 603, and cached into storage 316 or storage 305;

the present command: the action indicator interpreter 315 initializes presenting of the cached first media stream 610 on the screen of first device 310, indicated by the URL in the action indicator 603;

the control command: the action indicator interpreter 315 initializes a download and execution of the file indicated by the URL in the action indicator 603, in the first device 310, the Set-top box or a second device 320 when instructed thereto;

the cacheFUT and presFUT commands instruct the first device 310 to arm detection of an identifier with the specific sequence number AAA by identifier handler 314, as to play-out a cached first media stream indicated by the specific sequence number AAA;

First media storage 316 is arranged to cache and a first media stream 610, indicated and retrieved by an associated sequence number 602.

Antenna Interface 317, communicatively connected to antenna 310T, arranged for short range communication, as to transmit and receive communication with the Internet 400 via router 410, e.g. for retrieving the action identifier 603 from identifier storage 205, or requesting 570 the first media server 210 for a first media stream 610. Antenna Interface 317 is also arranged to communicate with Set-top box 300S, e.g. to receive the identifier 600 from the decoder 300 or to apply storage 305 for caching the first media stream 610.

The processor 311 is under the program instructions in control of the entities in the first device 310 listed, via an internal bus structure connecting all the entities in the first device 310.

The method and system described above is suitable for synchronizing two or more media streams or commands to one or more devices 310, 320.

The accessibility of the first media server 610 for the first media stream 610 might in the case of the use of the Internet 400 be an issue, as Internet is shared by many and therefore latency and available bandwidth depend on actual use of servers and links. In a continuous sequence of request for a specific stream or server, different reaction times may occur. It is well appreciated that the Internet is a valuable source of data and streams but its access and reaction time make synchronization of broadcasted streams and internet transported streams prone to errors, when relying on the Internet's response time. The idea presented applies Internet, but its use of the Internet in the preferred embodiment is limited to retrieving the desired action, and when the option is applied to have the cacheFUT or presFUT commands, Internet access is advantageously not depending on latency in the order of seconds.

The method and system provided are advantageously suitable to apply subtitles to second media streams 620, wherein the subtitles are stored in the first media server and provided in a synchronized way to the first-310 and/or second device 320.

The equidistant time points generated identifiers, advantageously enable later editing and allow skipping of material whilst maintaining synchronisation The method provided does not degrade the original and presented media as there is no watermarking or like technique applied in the method proposed.

The method provided does not require extensive mathematical equipment in the user devices like fingerprinting correlation devices for synchronising the second and first media streams.

The method advantageously allows media to be both (semi)live broadcasted and recorded as well, and in both cases the synchronization between the played-out content is maintained as long as the identifier storage for the particular second media is supported.

The method advantageously allows local- and personalized advertisement-clip insertion in both (semi)live broadcasted and even recorded sessions as the carrier maintains the identifier data, enabling a provider to instruct via the identifier storage to play-out these local/personalized advertisement-clips, while maintain a synchronized play-out.

The method advantageously allows control of the home-environment by a provider as to provide an optimal video and sound setting for a particular media played-out by means of the setting commands in the identifier storage.

The method advantageously provides a simple method for a non-intrusive anonymous statistics capture.

The invention claimed is:

1. A method for synchronized provision to a first device of at least two different media streams comprising a first media stream and a second media stream, the method comprising:
generating a plurality of identifiers that each indicate different sequence numbers to which respective action indicators are allocable, wherein the different sequence numbers indicate different respective locations in the second media stream, wherein at least some of the different respective locations are isochronous in the second media stream;
storing the plurality of identifiers in an identifier storage and allocating an action indicator to each of at least some of the stored plurality of identifiers, wherein at least one action indicator identifies the first media stream;
encoding a carrier with the plurality of identifiers and the second media stream, wherein the plurality of identifiers are encoded at locations in the second media stream that are indicated by the respective ones of the plurality of identifiers;
decoding the plurality of identifiers and the second media stream from the received carrier;
submitting the decoded plurality of identifiers to the first device;
providing the decoded second media stream to the first device;
retrieving, by the first device, any action indicators allocated to the decoded identifiers;
requesting the first media stream identified by at least one retrieved action indicator; and
providing the requested first media stream, such that the provisions of the first media stream and the second media stream to the first device are synchronized to each other based on the retrieved action indicators.

2. The method of claim 1, wherein the providing the requested first media stream comprises providing the first media stream to the first device.

3. The method of claim 1,
wherein each stored action indicator is further associated with an action type that is one of a plurality of action types;
wherein the retrieving further comprises retrieval of each action type associated with the stored action indicators; and
wherein the method further comprises, for each retrieved action indicator, determining an action to execute based on interpretation of the action type associated with the action indicator; and
wherein the at least one action indicator that identifies the first media stream identifies an address of the first media stream and is associated with an action type for retrieving the media stream at the identified address.

4. The method of claim 1, wherein each allocated action indicator indicates one of isochronous periods in the first media stream.

5. The method of claim 1, wherein the providing the requested first media stream comprises providing the first media stream to a second device separate from the first device.

6. The method of claim 1, wherein the plurality of identifiers each further indicate an identifier of the second media stream.

7. The method of claim 1, wherein the generation of the plurality of identifiers and a generation of the action identifiers are independent of one another.

8. A method for synchronized provision to a first device of at least two different media streams comprising a first media stream and a second media stream, the method comprising:
generating a plurality of identifiers, that each indicate different sequence numbers to which respective action indicators are allocable, wherein the different sequence numbers indicate different respective locations in the second media stream, wherein at least some of the different respective locations are isochronous in the second media stream;
storing, in an identifier storage, each of the plurality of identifiers and allocating an action indicator to each of at least some of the stored plurality of identifiers, wherein at least one action indicator identifies the first media stream; and
encoding a carrier with the plurality of identifiers and the second media stream, wherein the plurality of identifiers are encoded at locations in the second media stream that are indicated by the respective ones of the plurality of identifiers; and
transmitting the plurality of identifiers encoded in the carrier.

9. The method of claim 8, wherein the storing of each of the plurality of identifiers is performed in a database having records where a record has a sequence number indicated by the plurality of identifiers associated with zero action indicators.

10. The method of claim 8 wherein an action indicator identifies the first media stream using a Universal Resource Locator (URL).

11. The method of claim 8 wherein the identifier storage comprises stored records for each of the plurality of identifiers, wherein each of the stored records comprising a type field, which is any of an address or a command type, to be executed by the first device.

12. The method of claim 8, wherein the second media stream is a live broadcast provided by a broadcaster separate from the identifier generator, and the broadcaster assigns the action identifiers to a plurality of identifiers as the second media stream is generated, the plurality of identifiers generated before the second media stream is generated.

13. The method of claim 8, wherein the storing of each of the plurality of identifiers is performed in a database having records where a record has a sequence number indicated by the plurality of identifiers associated with a plurality of action indicators.

14. A system for synchronized provision to a first device of at least two different media streams comprising a first media stream and a second media stream, the system comprising:
an identifier generator comprising:
a processor;
a memory, the memory containing instructions executable by the processor whereby the identifier generator is configured to generate a plurality of identifiers, each of the plurality of identifiers indicating different sequence numbers to which respective action indicators are allocable, wherein the different sequence numbers indicate different respective locations in the second media stream, wherein at least some of the different respective locations are isochronous in the second media stream; and an interface configured to provide the plurality of generated identifiers to a storage;

the storage configured to store each of the plurality of generated identifiers, and allocate an action indicator to each of at least some of the stored plurality of generated identifiers, wherein at least one action indicator identifies the first media stream;

a first media server configured to provide the first media stream;

a second media server configured to provide a second media stream;

an encoder configured to encode a carrier with the plurality of generated identifiers and the second media stream, wherein the plurality of generated identifiers are encoded at locations in the second media stream that are indicated by the respective ones of the plurality of generated identifiers;

a decoder configured to:
decode the carrier into the plurality of identifiers and the second media stream;
submit each one of the decoded plurality of identifiers; and
provide the decoded second media stream to a first device; and the first device configured to:
receive each decoded identifier;
retrieve a plurality of stored action indicators, each corresponding to one of the decoded identifiers;
request for a first media stream represented by the retrieved action indicators; and
receive the requested first media stream, such that the provisions of the first media stream and the second media stream to the first device are synchronized to each other based on the retrieved action indicators.

15. The system according to claim 14,
wherein the storage is configured to store each of the action indicators with an associated action type that is one of a plurality of action types;
wherein the first device is further configured to retrieve the action types;
wherein the first device is further configured to receive the requested first media stream based on an execution according to each of the action types, wherein the execution comprises at least two of:
an address change for the identifier storage different from the address in use by the first device;
a setting to be downloaded and executed in the first device, for setting a particular mode of the first device;
a cache action for retrieving a download to local storage of the first media stream;
a present action for presenting a cached first media stream; and
a control action to be performed by the first device, controlling the decoder, the second device, or a further device.

16. The system of claim 14, further comprising a second device, the second device configured to additionally receive the requested first media stream.

17. An Identifier generator for synchronized provision of at least two different media streams comprising a first media stream and a second media stream to a first device, the Identifier generator comprising:
an interface configured to communicatively connect to other entities;
a media identity storage configured to store a plurality of indicators;
a processor; and
a memory, the memory containing instructions executable by the processor whereby the Identifier generator is configured to:
generate a plurality of identifiers, each of the plurality of identifiers indicating different sequence numbers to which respective action indicators are allocable, wherein the different sequence numbers indicate different respective locations in the second media stream, wherein at least some of the different respective locations are isochronous in the second media stream;
store, in the media identity storage, each of the plurality of identifiers and allocate an action indicator to each of at least some of the stored plurality of identifiers, wherein at least one action indicator identifies the first media stream;
encode a carrier with the plurality of identifiers and the second media stream, wherein the plurality of identifiers are encoded at locations in the second media stream that are indicated by the respective ones of the plurality of identifiers; and
transmit the plurality of identifiers encoded in the carrier via the interface.

18. The Identifier generator according to claim 17, where the Identifier generator further comprises a timer configured to time the generation of sequence numbers on equidistant time points.

* * * * *